(12) United States Patent
Bolton

(10) Patent No.: US 12,214,431 B1
(45) Date of Patent: Feb. 4, 2025

(54) LARGE RADIUS ARC CUTTING JIG

(71) Applicant: Consolidated Nuclear Security, LLC, Oak Ridge, TN (US)

(72) Inventor: Justin T. Bolton, Oak Ridge, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 351 days.

(21) Appl. No.: 17/372,765

(22) Filed: Jul. 12, 2021

(51) Int. Cl.
*B23C 9/00* (2006.01)
*B23B 3/26* (2006.01)
*B23Q 1/64* (2006.01)

(52) U.S. Cl.
CPC .................. *B23C 9/00* (2013.01); *B23B 3/26* (2013.01); *B23Q 1/64* (2013.01)

(58) Field of Classification Search
CPC .... B23B 3/26; B23B 5/08; B23B 5/36; B23B 5/40; B23Q 3/06; B23Q 3/02; B23Q 3/152; B23Q 1/25; B23Q 1/26; B23Q 1/262; B23Q 1/265; B23Q 1/28; B23Q 1/285; B23Q 1/30; B23Q 1/32; B23Q 1/40; B23Q 1/62
See application file for complete search history.

(56) References Cited

U.S. PATENT DOCUMENTS

| | | | | |
|---|---|---|---|---|
| 39,817 A | * | 9/1863 | Johnson | B23B 5/40 82/12 |
| 253,410 A | * | 2/1882 | Miles | B23B 5/38 142/38 |
| 670,962 A | * | 4/1901 | Lodge et al. | B23B 5/40 82/12 |
| 837,660 A | * | 12/1906 | Blanpain et al. | B24B 9/16 451/361 |
| 1,106,602 A | | 8/1914 | Walker et al. | |
| 1,556,949 A | * | 10/1925 | Mall | B23B 5/40 82/12 |
| 2,365,436 A | * | 12/1944 | Saucier | B23Q 1/525 269/69 |
| 2,455,024 A | * | 11/1948 | Schneider | B23B 47/281 82/170 |
| 2,748,624 A | | 6/1956 | Costello | |
| 2,808,741 A | | 10/1957 | Reinhold | |
| 2,859,667 A | * | 11/1958 | Teubner | B23Q 27/00 408/69 |
| 3,026,752 A | * | 3/1962 | Zabel | B23Q 1/5468 82/12 |
| 3,835,528 A | * | 9/1974 | Garrett | B23B 5/40 82/12 |
| 4,187,601 A | * | 2/1980 | Aldrin | B23Q 1/48 451/340 |
| 4,840,095 A | * | 6/1989 | Nussbaumer | B23Q 1/4804 82/149 |
| 4,927,125 A | * | 5/1990 | Hunter | B23Q 1/525 33/537 |

* cited by examiner

*Primary Examiner* — Nicole N Ramos
(74) *Attorney, Agent, or Firm* — Luedeka Neely, P.C.

(57) ABSTRACT

A jig for adapting a cutting machine to cut a work piece along a radius. The jig includes a base for mounting the jig to the cutting machine. A bridge is pivotally mounted to the base. The bridge is further configured to receive the work piece. A slide is disposed beneath the bridge, where the slide is configured to selectively engage the bridge at a desired position along a length of the bridge. The slide mounts to the table at a variable position along a length of the table, and the slide is further configured to move the bridge relative to the base in a generally arcuate manner.

19 Claims, 4 Drawing Sheets

LARGE RADIUS ARC CUTTING JIG

GOVERNMENT RIGHTS

The U.S. Government has rights to this invention pursuant to contract number DE-NA0001942 between the United States Department of Energy and Consolidated Nuclear Security, LLC.

FIELD

This disclosure relates to the field of jigs. More particularly, this disclosure relates to jigs for making relatively large radius arc cuts with a cutting machine.

BACKGROUND

Cutting machines are used to cut away material from a work piece, so as to fabricate a desired shape in the work piece. As used herein, the term cutting machine refers to at least one of a traditional vertical-spindle milling machine, or a horizontal-spindle machine, such as a lathe, that can be used either for milling along a radius or for drilling holes along a radius in a work piece.

Manual cutting machines typically have stages that are movable in the X, Y, and Z directions, which directions respectively indicate cuts along the length of the piece, across the breadth of the piece, and up and down into the piece. A rotary stage can be added to the cutting machine, which allows for circular cuts or partially circular cuts (arcs) to be made in the work piece. In addition, a rotary stage enables an easier method for cutting holes or other shapes along a complete or partial circular path on the work piece.

Motors can be added to all of these motions to facilitate precise and optimal speeds of the cuts. In addition, the motors can be controlled by computers so that all of the cuts on the work piece can be precisely and repeatedly made from one piece to another, and also so that more complicated cuts can be made, such as by moving the work piece in the X, Y, and Z directions simultaneously.

However, adding a computer to a cutting machine dramatically increases the cost of the cutting machine, as does adding motors to control the motion, which motors are a requirement if computer control for complex cuts is desired. Such costs are often prohibitive to the machine owner.

Further, when cutting arcs is desired for the finished design of the work piece, the rotary table that is typically required to make such cuts can only be as large as the distance between the spindle of the machine that holds the cutting tool and the support between the spindle and the rotary table that is holding the work piece. For many moderately-priced mills, this distance is no more than about six to eight inches or so. Thus, the rotary head, which is centered below the spindle, cannot be used to cut an arc with a radius that is greater than about that same distance. Any radius that is greater than the distance between the spindle and the support is defined as a large radius herein.

What is needed, therefore, is an apparatus that enables a cutting machine to make cuts in a large radius arc in a workpiece.

SUMMARY

The above and other needs are met by a jig for adapting a cutting machine to cut a work piece along a radius. The jig includes a base configured to be mounted to a table of the cutting machine with the base including a pivot. A bridge is pivotally mounted to the pivot, whereby the pivot retains the bridge to the base at a desired position and the bridge is further configured to receive the work piece. A slide is configured to be mounted to the table of the cutting machine at a variable position along a length of the table such that the slide is disposed beneath the bridge. The slide is configured to selectively engage the bridge at a desired position along a length of the bridge and is configured to move the bridge relative to the base in a generally arcuate manner.

According to certain embodiments, the slide includes a frame configured to be mounted to the table, a guide disposed within the frame configured to move in a direction that is substantially perpendicular to the length of the table, and a body that is rotatably connected to the guide. The body is configured to selectively engage the bridge at the desired position along the length of the bridge. In some embodiments, the slide further includes a wheel configured to move the guide. In some embodiments, the slide includes a lock configured to retain the desired position of the bridge to the body of the slide.

According to certain embodiments, the base includes the slide.

According to certain embodiments, the pivot includes a plate mounted to the base having a hole disposed through the plate and a rotary piece retained to the base with the plate such that a distal end of the rotary piece extends from the plate for engaging a recess disposed in a bottom surface of the bridge.

According to another embodiment of the disclosure, a jig for adapting a cutting machine to cut a work piece along a radius includes a base configured to be mounted to a table of the cutting machine. A bridge having a distal end and a proximal end is pivotally mounted to the base adjacent the distal end, and the bridge is configured to receive the work piece in a plurality of locations between the distal end and the proximal end. A slide is configured to engage the bridge between the distal end and the proximal end of the bridge. The slide includes a guide configured to move in a direction substantially perpendicular to a length of the table such that movement of the guide moves the bridge in a generally arcuate manner.

According to certain embodiments, the slide includes a frame configured to be mounted to the table with the guide being disposed within the frame and a body that is rotatably connected to the guide. According to this embodiment, the guide is configured to selectively engage the bridge at a desired position between the distal end and the proximal end of the bridge. In some embodiments, the slide further includes a wheel configured to move the guide. In some embodiments, the slide includes a lock configured to retain the desired position of the bridge to the body of the slide.

According to certain embodiments, the jig further includes a pivot for pivotally mounting the bridge to the base. The pivot includes a plate mounted to the base having a hole disposed through the plate and a rotary piece retained to the base with the plate such that a distal end of the rotary piece extends from the plate for engaging a recess disposed in a bottom surface of the bridge.

According to certain embodiments, the slide is configured to be mounted to the table separate from the base.

According to yet another embodiment of the disclosure, a method for milling a work piece on a cutting machine having a table and a cutting head includes mounting a jig to the table of the cutting machine with the jig including: a base, a bridge having a distal end and a proximal end, the bridge pivotally mounted to the base adjacent the distal end at a pivot point, and a slide having a guide configured to move in a direction substantially perpendicular to a length of the table, the guide configured to rotatably engage the bridge between the distal end and the proximal end of the bridge. The method further includes positioning the work piece between the distal end and the proximal end of the bridge; engaging the cutting head of the cutting machine with the work piece; and moving the guide of the slide such that movement of the guide moves the bridge in a generally arcuate manner for producing a radius cut in the work piece.

According to certain embodiments, the step of positioning the work piece between the distal end and the proximal end of the bridge includes selecting an effective radius of a cut on the work piece by selecting a desired distance of the work piece from the pivot point. In some embodiments, the method further includes increasing the effective radius of the cut by moving the work piece farther away from the pivot point. In some embodiments, the method further includes decreasing the effective radius of the cut by moving the work piece closer to the pivot point.

According to certain embodiments, the method further includes selectively positioning the slide along a length of the table. According to some embodiments, the slide is positioned adjacent the cutting head.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
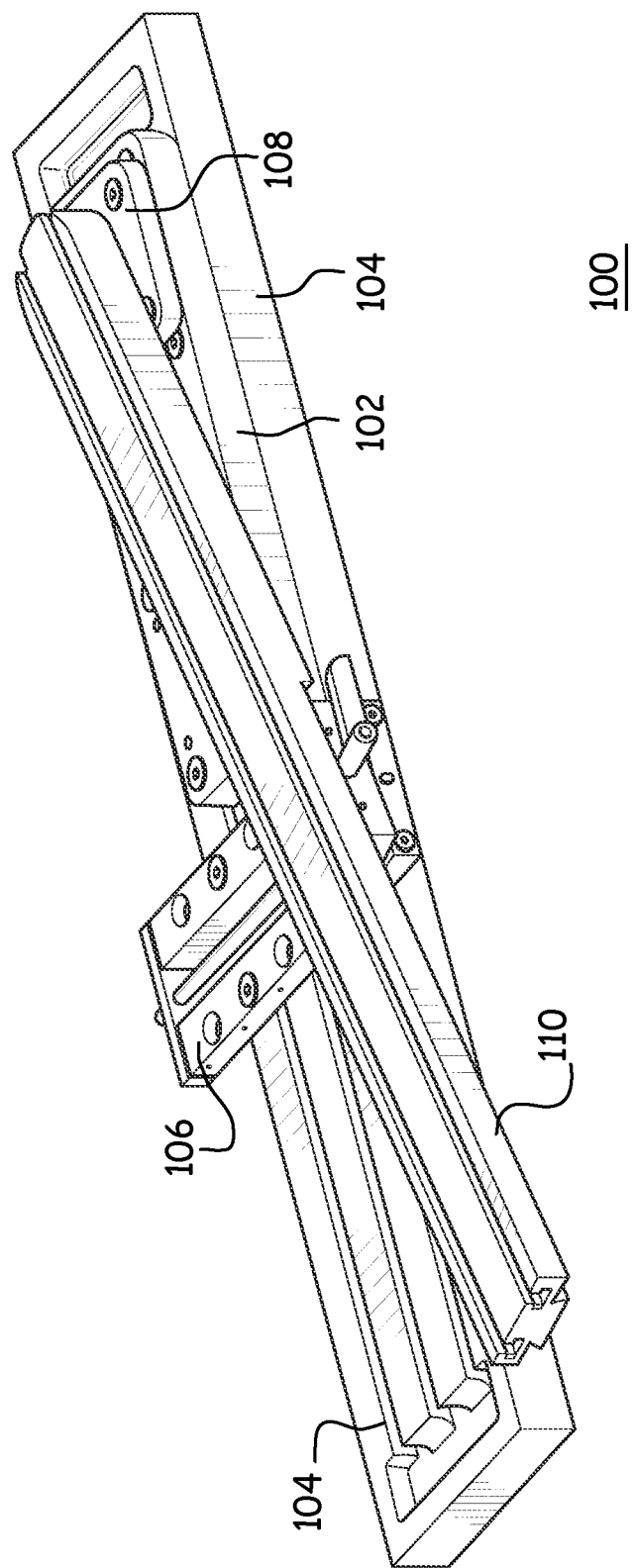
FIG. 1 is a perspective view of a large radius arc cutting jig according to an embodiment of the present disclosure.
Figure 2:
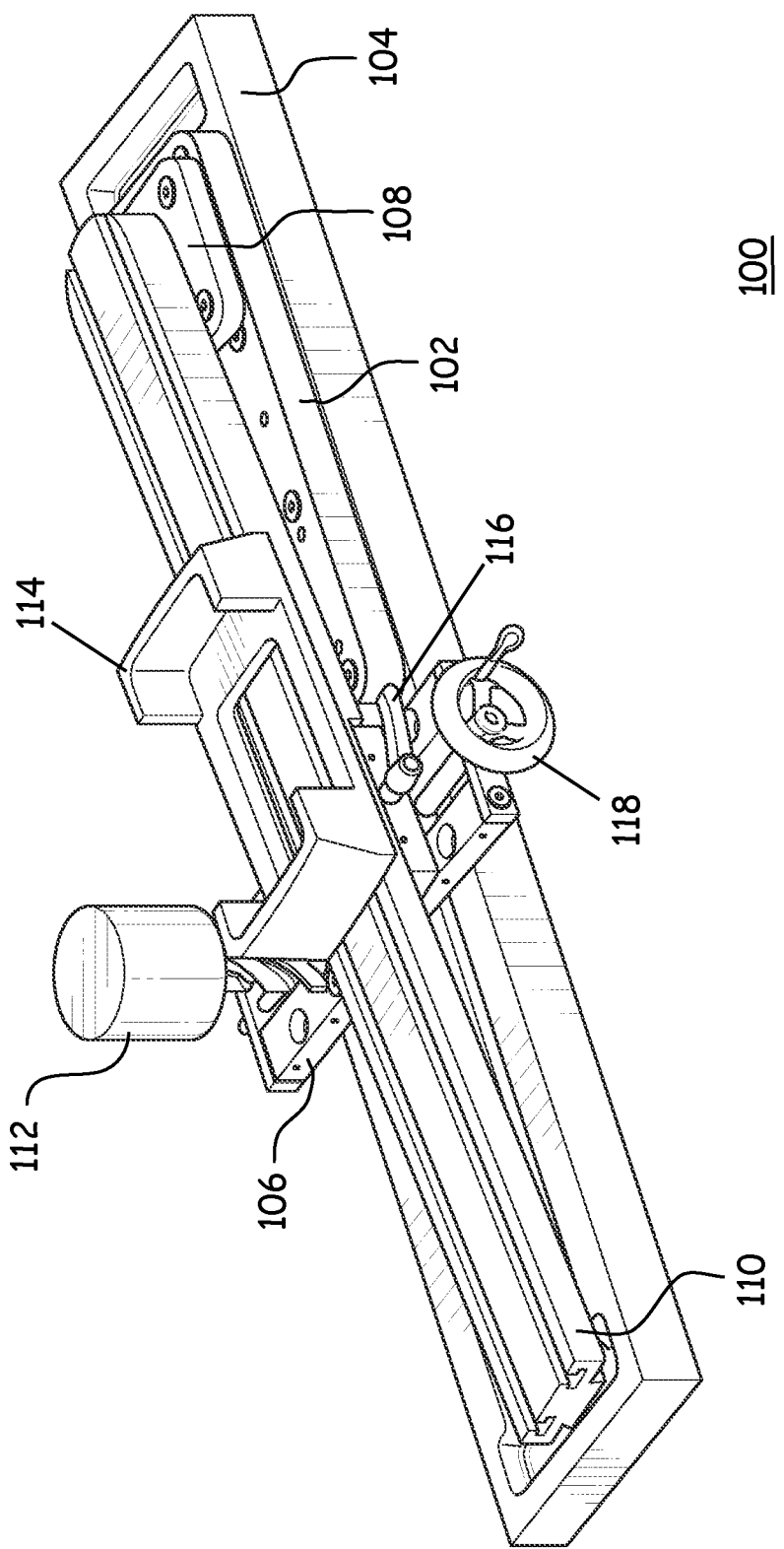
FIG. 2 is a perspective view of a large radius arc cutting jig holding a work piece against a cutting tool according to an embodiment of the present disclosure.

With reference now to FIGS. 1-2, there are depicted perspective views of a large radius arc cutting jig 100 according to an embodiment of the present disclosure. In a basic embodiment, the jig 100 is comprised of four major components, being a base 102, a slide 106, a pivot 108, and a bridge 110. Table 104 is a part of the cutting machine to which the jig 100 is mounted and is not a part of the jig 100.

FIG. 2 depicts a cutting tool 112 and a work piece 114 in a positional relationship in which they might appear during use of the jig 100. Not depicted are the other elements of the cutting machine to which the cutting tool 112 is attached and with which the jig 100 is used. Also not depicted are the various means known in the art by which the work piece 114 can be attached to the bridge 110 of the jig 100.

In operation, and as explained in more detail below, the base 102 and slide 106 are mounted to the table 104. The pivot 108 is incorporated into or otherwise connected to the base 102 (for purposes of the present disclosure, "the base including a pivot" should be construed as including an embodiment in which a pivot mechanism is incorporated into the base 102 itself or an embodiment in which a pivot is secured to the base as a separate component). The bridge 110 is pivotally retained to the pivot 108 at a distal end and then slidably connected to the slide 106 along the length of the bridge 110 between the bridge's distal end and proximal end. A work piece 114 is then secured/positioned along the length of the upper surface of the bridge 110. Thus, by moving the bridge 110 across the slide 106 in a generally Y direction such that the bridge 110 pivots at its distal end, the work piece 114 is moved in a generally arcuate path relative to the fixed position of the cutting tool 112.

The radius of the arc is determined by the distance from the pivot 108 to the position at which the work piece 114 is attached to the bridge 110. Accordingly, by moving the position of the work piece 114 along the length of the bridge 110, the effective radius of the cut on the work piece 114 that is made by the cutting tool 112 can be changed. More specifically, as the work piece 114 is moved farther away from the pivot 108, the effective radius of the arcuate cut made by the cutting tool 112 is generally increased. Conversely, as the work piece 114 is moved closer toward the pivot 108, the effective radius of the arcuate cut made by the cutting tool 112 is generally decreased.

With continued reference to FIGS. 1-2, the bridge 110 is preferably formed with a generally elongate shape as opposed to a circular shape. As a result, the length of the bridge 110, and thereby the radius of the arc that can be cut with the jig 100, can be significantly greater than the distance between the spindle of the cutting machine and the support of the cutting machine.

With reference to FIG. 2, the base 102 includes parts according to the art for attaching the base 102 to the table 104 of the cutting machine on which the jig 100 is to be used, such as an X, Y, Z, movement stage. Thus, the base 102 in one embodiment has at least one of lands for clamping, holes for bolting, and slots for engaging attachments. The slide 106 may also be mounted to the table 104 of the cutting machine using similar means known in the art.

According to another aspect of the disclosure, the slide 106 is preferably positionable along the length of the table 104. By positioning the slide 106 farther from the pivot 108, the bridge 110 is better supported by the slide 106. Similarly, when an arc with a relatively large radius is to be cut (i.e., the work piece 114 is disposed farther from the pivot point 108), the slide 106 being similarly positioned adjacent the work piece 114 provides relatively greater support to the work piece 114 as it is being machined. Thus, according to certain embodiments, the slide 106 is positioned beneath the cutting head 112. In this regard, positioning the slide 106 under the cutting head 112 tends to add significant rigidity to the jig 100. On the other hand, the farther the work piece 114 is from the slide 106, the more vibration the work piece 114 will see, resulting in negative impacts on the work piece 114 and the cutting head 112.

According to another aspect of the disclosure, with the slide 106 being disposed farther from the pivot point 108, the movement of the bridge 110 in the Y direction using the slide 106 can allow for tighter tolerances to be held because the slide 106 must move the bridge 110 farther to affect the same movement of the bridge 110 in the arcuate path relative to the base 102. In other words, in instances where the work piece 114 needs arcuate cut paths held to a tighter tolerance, the machine operator can position the slide 106 farther from the pivot point 108. This results in the bridge 110 moving in smaller increments when pivoting about the pivot point 108.

According to an alternate embodiment of the disclosure, the slide 106 may be connected to or otherwise incorporated into the base 102. In other words, slide 106 could be mounted to the table 104 as part of the base 102. According to this embodiment, the slide 106 may always be positioned a fixed distance from the pivot 108. Alternatively, the base 104 could include means for extending the distance of the slide 106 with respect to the pivot 108. In other embodiments, the pivot 108 could be positionable along the length of the base 102 (see different fastener hole sets in the base 102 of FIG. 3). For example, the base 102 could be lengthened to generally the length of the table 104. The base 102 could include the slide 106 at one end of the base 102. The distance between the slide 106 and the pivot 108 could then be adjusted by adjusting the position of the pivot 108 along the length of the base 102.

In some embodiments of the slide 106, a wheel 118 is used to move the bridge 110 in the Y direction. In some embodiments, the wheel 118 is motorized and computer controlled. It is appreciated that other means for moving the bridge 110 with respect to the slide 106 are contemplated herein and intended to be within the scope of the present disclosure. In some embodiments, a lock 116, such as a lever that applies pressure between the slide 106 and the bridge 110, may be used to retain the relative position of the slide 106 to the bridge 110.

Figure 3:
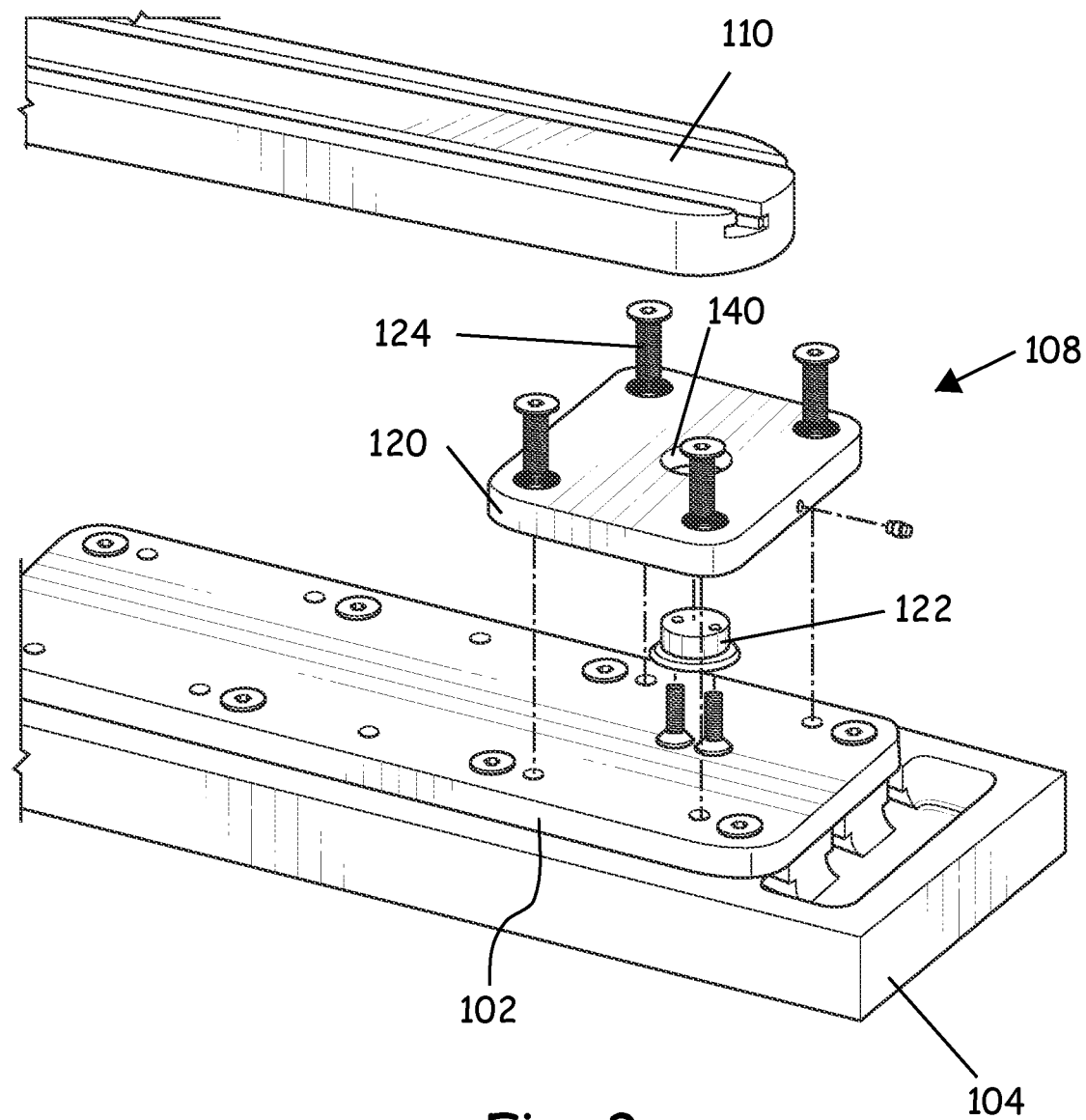
FIG. 3 is an exploded perspective view of a pivot for a large radius arc cutting jig according to an embodiment of the present disclosure.

With reference now specifically to FIG. 3, there is depicted in an exploded view with somewhat greater detail the arrangement of the various elements of a pivot 108 according to an embodiment of the present disclosure. For example, in the embodiment depicted, the base 102 is mounted to the table 104 and the pivot 108 is then mounted to the base 102. According to this embodiment, the pivot 108 is formed with a rotary piece 122 that is retained to the base 102 with a plate 120. The plate is mounted to the base 102 with screws 124. With the rotary piece 122 retained to the base 102 with plate 120, the distal end of the rotary piece 122 traverses a hole 140 in the plate 120 and engages a corresponding circular recess (not depicted) on the bottom surface of the bridge 110. It is appreciated that other means for forming the pivot 108 are also contemplated herein and intended to be within the scope of the present disclosure.

Figure 4:
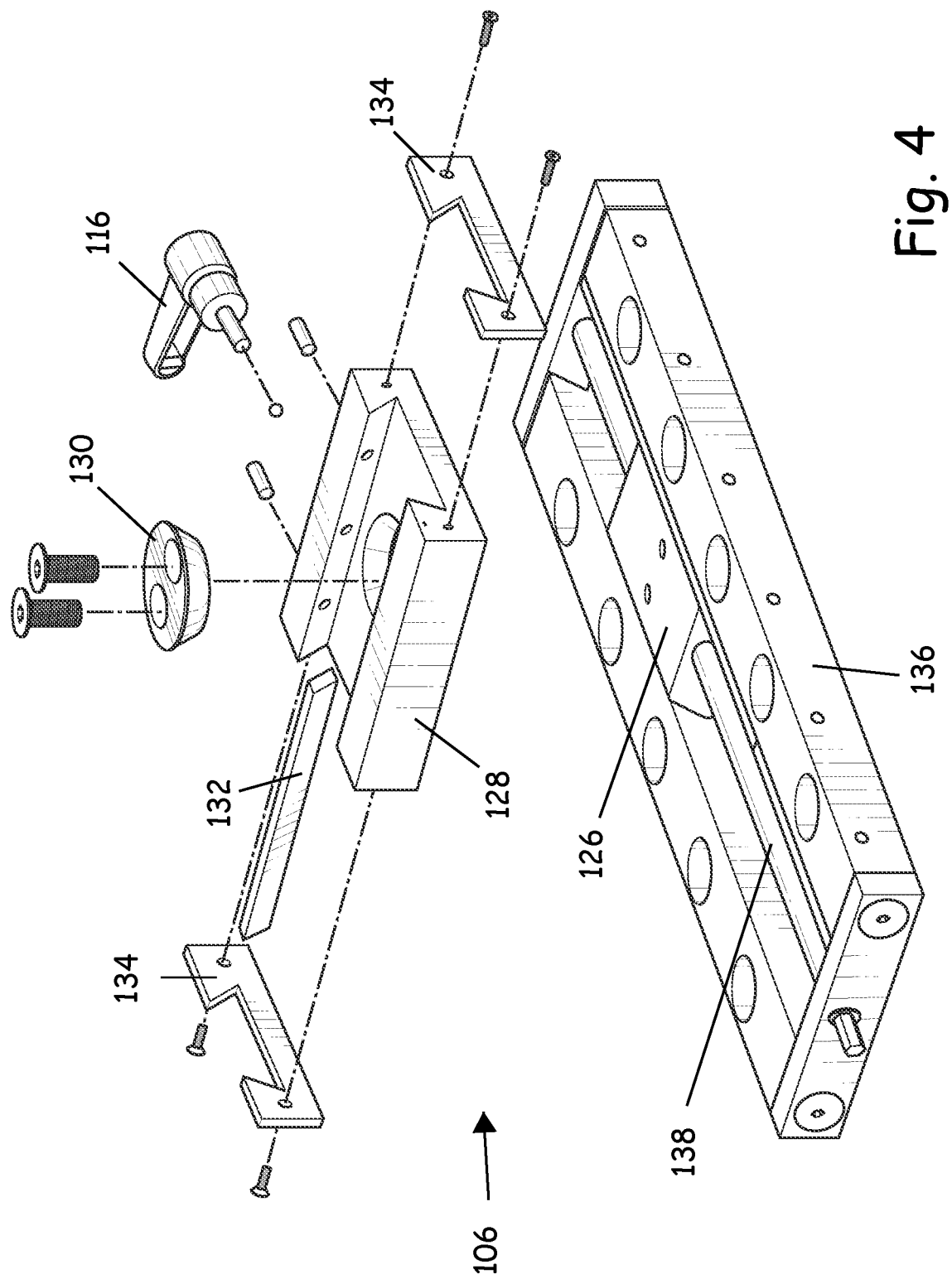
FIG. 4 is an exploded perspective view of a slide for a large radius arc cutting jig according to an embodiment of the present disclosure.

With reference now specifically to FIG. 4, there is depicted in an exploded view with somewhat greater detail the configuration of the slide 106 according to an embodiment of the present disclosure. For example, in the embodiment depicted, the slide 106 includes a frame 136 that is intended to be mounted to the table 104 of the cutting machine as depicted in FIGS. 1-2. The frame 136 includes a guide 126 that moves back and forth within the frame 136. The guide 126 moves by actuation of a rod 138, which in some embodiments is a threaded rod that is turned by the wheel 118. A body 128 is rotatably retained to the guide 126 with a retainer 130. The bridge 110 is then mounted to the body 128. In this manner, the slide 106 in conjunction with the pivot 108 is operable to move the bridge 110 in an arcuate path when the guide 126 is moved in a Y direction. It is appreciated that other embodiments of the slide 106 are also contemplated herein and intended to be within the scope of the present disclosure.

In some embodiments, and as noted above, a lock 116 may be used to retain the relative position of the bridge 110 to the body 128. The lock 116 can be used when making stationary cuts, such as a hole, in the work piece 114. In certain embodiments, and as depicted in FIG. 4, the lock 116 acts by pressing a plate 132 against a complimentary portion of the bridge 110 that fits through a slot in the body 128. Ends 134 may be used to help retain the plate 132 within the slide 106.

In one embodiment of the disclosure, the jig 100 is used according to the following steps:
Step 1: Mount the jig 100 to the cutting machine table 104 by mounting the base 102 and the slide 106.
Step 2: Use a dial indicator to ensure that the bridge 110 is straight, and zero the digital read out.
Step 3: Zero the cutting tool 112 on the pivot 108 or other known markers.
Step 4: Secure the work piece 114 to the bridge 110 at an appropriate distance from the pivot 108 for the desired radius cuts.
Step 5: Touch off the work piece 114 and re-zero as desired.
Step 6: Power on the cutting machine and engage the cutting tool 112 with the work piece 114.
Step 7: Use the slide 106 to move the bridge 110 in a generally Y direction, thereby creating a large radius cut in the work piece 114 as result of the bridge 110 being connected to pivotally connected to the slide 106 and the pivot 108.
Step 8: Adjust the cutting tool 112 for depth of cut and repeat as needed.
Step 9: Use the means provided with the cutting machine table 104 to move the work piece 114 in in the X, Y, and Z directions as needed to complete the work piece 114.

The foregoing description of embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A jig for adapting a cutting machine to cut a work piece along a radius, the jig comprising:
 a base configured to be mounted to a table of the cutting machine, the base having a base longitudinal axis extending along a base distal end and a base proximal end;
 a pivot defining a pivot point disposed adjacent the base distal end;
 a bridge having a bridge distal end and a bridge proximal end, the bridge pivotally mounted to the base adjacent the base distal end via the pivot, and the bridge configured to receive the work piece in one of a plurality of secured positions between the bridge distal end and the bridge proximal end, and
 a slide configured to engage the bridge between the bridge proximal end and the pivot point of the pivot, the slide extending along a slide longitudinal axis extending along a direction substantially perpendicular to the base longitudinal axis, and the slide including a guide configured to move in the direction substantially perpendicular to the base longitudinal axis such that the movement of the guide in the direction substantially perpendicular to the base longitudinal axis causes the bridge and corresponding work piece secured to the bridge to move in a generally arcuate manner.

2. The jig of claim 1, wherein the slide includes:
a frame configured to be mounted to the table with the guide being disposed within the frame; and
a body that is rotatably connected to the guide such that the body is configured to rotate with respect to the guide, the body being configured to selectively engage the bridge at a desired position between the bridge distal end and the bridge proximal end.

3. The jig of claim 2, wherein the slide further includes a wheel configured to move the guide.

4. The jig of claim 2, wherein the slide includes a lock configured to retain the desired position of the bridge to the body of the slide.

5. The jig of claim 1, wherein the pivot includes a plate mounted to the base having a hole disposed through the plate and a rotary piece retained to the base with the plate such that a distal end of the rotary piece extends from the plate for engaging a recess disposed in a bottom surface of the bridge for forming the pivot point.

6. The jig of claim 1, wherein the slide is configured to be mounted to the table separate from the base.

7. A method for milling a work piece on a cutting machine having a table and a cutting tool, the method comprising the steps of:
mounting a jig to the table of the cutting machine, the jig including:
a base having a longitudinal axis extending along a base distal end and a base proximal end,
a pivot defining a pivot point disposed adjacent the base distal end;
a bridge having a bridge distal end and a bridge proximal end, the bridge pivotally mounted to the base adjacent the base distal end via the pivot, and the bridge configured to receive the work piece in one of a plurality of secured positions between the bridge distal end and the bridge proximal end, and
a slide configured to engage the bridge between the bridge proximal end and the pivot point of the pivot, the slide extending along a slide longitudinal axis extending along a direction substantially perpendicular to the base longitudinal axis, and the slide having a guide configured to move in the direction substantially perpendicular to the base longitudinal axis of the base such that the movement of the guide in the direction substantially perpendicular to the base longitudinal axis causes the bridge and corresponding work piece secured to the bridge to move in a generally arcuate manner;
securing the work piece between the bridge distal end and the bridge proximal end in one of the plurality of secured positions;
engaging the cutting tool of the cutting machine with the work piece; and
moving the guide of the slide such that the movement of the guide in the direction substantially perpendicular to the base longitudinal axis moves the bridge and corresponding work piece secured to the bridge in a generally arcuate manner for producing a radius cut in the work piece.

8. The method of claim 7, wherein the step of securing the work piece between the bridge distal end and the bridge proximal end includes selecting an effective radius of a cut on the work piece by selecting a desired distance of the work piece from the pivot point.

9. The method of claim 8, further comprising increasing the effective radius of the cut by moving the work piece farther away from the pivot point.

10. The method of claim 8, further comprising decreasing the effective radius of the cut by moving the work piece closer to the pivot point.

11. The method of claim 7, further comprising selectively positioning the slide along a length of the table.

12. The method of claim 7, wherein the slide is positioned adjacent the cutting tool.

13. The jig of claim 1, wherein the slide is configured to engage the bridge at a variable position between the bridge distal end and the bridge proximal end.

14. A jig for adapting a cutting machine having a cutting tool in a fixed position to cut a work piece along a radius, the jig comprising:
a base configured to be removably mounted to a table of the cutting machine, the base having a base longitudinal axis extending along a base distal end and a base proximal end;
a bridge pivotally mounted to the base at a pivot point and having a bridge distal end and a bridge proximal end, the bridge configured to receive the work piece in one of a plurality of secured positions between the bridge distal end and the bridge proximal end for adjustably positioning the work piece adjacent to the fixed position of the cutting tool; and
a slide configured to engage the bridge between the bridge proximal end and the pivot point of the bridge, the slide extending along a slide longitudinal axis extending along a direction substantially perpendicular to the base longitudinal axis, and the slide including a guide configured to move in the direction substantially perpendicular to the base longitudinal axis such that the movement of the guide in the direction substantially perpendicular to the base longitudinal axis causes the bridge and corresponding work piece secured to the bridge to move in a generally arcuate manner in relation to the fixed position of the cutting tool of the cutting machine.

15. The jig of claim 14, wherein the slide includes:
a frame configured to be mounted to the table with the guide being disposed within the frame; and
a body that is rotatably connected to the guide such that the body is configured to rotate with respect to the guide, the body being configured to selectively engage the bridge at a desired position between the bridge distal end and the bridge proximal end.

16. The jig of claim 15, wherein the slide further includes a wheel configured to move the guide.

17. The jig of claim 15, wherein the slide includes a lock configured to retain the desired position of the bridge to the body of the slide.

18. The jig of claim 14, wherein the slide is configured to be mounted to the table separate from the base.

19. The jig of claim 14, wherein the slide is configured to engage the bridge at a variable position between the bridge distal end and the bridge proximal end.

* * * * *